United States Patent
Lai (10) Patent No.: US 9,785,344 B2
(45) Date of Patent: Oct. 10, 2017

(54) PORTABLE ELECTRONIC APPARATUS AND TOUCH DETECTING METHOD THEREOF

(71) Applicant: Winbond Electronics Corp., Taichung (TW)

(72) Inventor: Chih-Jing Lai, New Taipei (TW)

(73) Assignee: Winbond Electronics Corp., Taichung (TW)

( * ) Notice: Subject to any disclaimer, the term of this patent is extended or adjusted under 35 U.S.C. 154(b) by 42 days.

(21) Appl. No.: 14/470,960

(22) Filed: Aug. 28, 2014

(65) Prior Publication Data

US 2016/0062545 A1    Mar. 3, 2016

(51) Int. Cl.
G06F 3/041 (2006.01)
G06F 3/044 (2006.01)
G06F 3/0488 (2013.01)

(52) U.S. Cl.
CPC .. *G06F 3/04886* (2013.01); *G06F 2200/1614* (2013.01); *G06F 2203/04803* (2013.01)

(58) Field of Classification Search
None
See application file for complete search history.

(56) References Cited

U.S. PATENT DOCUMENTS

2006/0238517 A1* 10/2006 King ............... G06F 1/1626
                                              345/173
2007/0257895 A1   11/2007 Tolaio
2011/0285645 A1* 11/2011 Cho ................ G06F 3/0416
                                              345/173
2012/0023459 A1*  1/2012 Westerman ...... G06F 3/03547
                                              715/863
2012/0075212 A1*  3/2012 Park ............... G06F 3/04886
                                              345/173
2012/0223906 A1*  9/2012 Zhou ............... G06F 3/0416
                                              345/173
2013/0241853 A1   9/2013 Tanaka
(Continued)

FOREIGN PATENT DOCUMENTS

CN      102289321      12/2011
CN      102830844      12/2012
(Continued)

OTHER PUBLICATIONS

"Office Action of Taiwan Counterpart Application," dated Sep. 8, 2015, p. 1-p. 3, in which the listed references were cited.
(Continued)

*Primary Examiner* — Bryan Earles
(74) *Attorney, Agent, or Firm* — Jianq Chyun IP Office (57) ABSTRACT

A portable electronic apparatus and a touch detecting method thereof are provided. In the method, a touch is detected by a touch screen of the portable electronic apparatus. Then, whether the touch is located in an edge area of the touch screen is determined. If it is determined that the touch is located in the edge area of the touch screen, the touch time during which the touch continues and no other touch is detected by the touch screen is accumulated, and whether the accumulated touch time exceeds a preset time is determined. If the accumulated touch time exceeds the preset time, related information of the touch is removed from an event triggered by the touch until the touch ends.

4 Claims, 4 Drawing Sheets

(56) References Cited

U.S. PATENT DOCUMENTS

| | | | |
|---|---|---|---|
| 2013/0278554 A1 | 10/2013 | Ide | |
| 2013/0285956 A1* | 10/2013 | Kamii | G06F 3/04886 345/173 |
| 2014/0340338 A1* | 11/2014 | Kim | G06F 3/0488 345/173 |
| 2015/0138046 A1* | 5/2015 | Moon | G06F 3/0416 345/7 |

FOREIGN PATENT DOCUMENTS

| | | |
|---|---|---|
| CN | 102937920 | 2/2013 |
| TW | M428422 | 5/2012 |
| TW | 201316211 | 4/2013 |
| TW | 201324268 | 6/2013 |
| TW | 201329807 | 7/2013 |

OTHER PUBLICATIONS

"Office Action of China Counterpart Application," issued on Jun. 15, 2017, p1-p6, in which the listed references were cited.

* cited by examiner

PORTABLE ELECTRONIC APPARATUS AND TOUCH DETECTING METHOD THEREOF

BACKGROUND OF THE INVENTION

1. Field of the Invention

The invention generally relates to an electronic apparatus and a touch detecting method thereof and particularly relates to a portable electronic apparatus and a touch detecting method thereof.

2. Description of Related Art

The touch screen is a display device in which capacitive, resistive, or other types of touch detection components are integrated on a thin display panel such as a liquid crystal display (LCD) panel. The touch screen may simultaneously provide the display function and the touch input function and is characterized by simple and intuitive operation, such that the touch screen has gradually become the fundamental component equipped by various portable electronic apparatuses, such as mobile phones, tablet PCs, personal digital assistants (PDAs), or multimedia players.

In order for users to easily carry the portable electronic apparatuses, the portable electronic apparatuses are required to be light, thin, compact, and small, which poses a limitation to the size of the touch screens of the portable electronic apparatuses. In order to dispose a larger touch screen in a limited space and provide users with a large display and touch operation area, current portable electronic apparatuses are designed to have slim borders.

However, because of the slim border design, the hand of the user holding the portable electronic apparatus often touches the touch screen inadvertently when the user operates the portable electronic apparatus. This often results in false actions to the portable electronic apparatus.

SUMMARY OF THE INVENTION

Accordingly, the invention is directed to a portable electronic apparatus and a touch detecting method thereof, which are able to avoid false actions caused by the user's hand holding the portable electronic apparatus.

In an embodiment of the invention, a touch detecting method adapted for a portable electronic apparatus having a touch screen is provided. In the touch detecting method, a touch is detected by the touch screen, and whether the touch is located in an edge area of the touch screen is determined. If the touch is located in the edge area of the touch screen, a touch time during which the touch continues and no other touch is detected is accumulated, and whether the accumulated touch time exceeds a preset time is determined. If the touch time exceeds the preset time, related information of the touch is removed from an event triggered by the touch until the touch ends.

According to an embodiment of the invention, the portable electronic apparatus further includes a gravity sensor, and before the step of determining whether the touch is located in the edge area of the touch screen, the touch detecting method further detects an orientation of the portable electronic apparatus by using the gravity sensor, wherein the orientation is one of a transverse state and a longitudinal state. Next, the edge area for determining the touch location is set to be two edge areas of the touch screen in a transverse direction under the orientation.

According to an embodiment of the invention, after the step of setting the edge area for determining the touch location to be the two edge areas of the touch screen in the transverse direction under the orientation, the method further detects whether the orientation changes by using the gravity sensor. If the orientation changes, the edge area for determining the location is adjusted to be the two edge areas of the touch screen in the transverse direction under the changed orientation.

In an embodiment of the invention, a touch detecting method adapted for a portable electronic apparatus having a touch screen is provided. In the touch detecting method, a screen wake-up signal in a screen-off state is detected. The touch screen is activated to detect the touch at the edge area and whether the touch is located in an edge area of the touch screen is determined if the screen wake-up signal is detected. If the touch is located in the edge area of the touch screen, related information of the touch is removed from an event triggered by the touch until the touch ends.

In an embodiment of the invention, a portable electronic apparatus includes a touch screen, a storage unit, and at least one processing unit is provided, in which the touch screen is configured to detect a touch, and the storage unit is configured to record a plurality of modules. The processing unit is connected to the touch screen and the storage unit and configured to access and execute the modules recorded in the storage unit. The modules include a touch location determination module, a touch time determination module, and a touch information removing module. The touch location determination module determines whether the touch is located in an edge area of the touch screen. The touch location determination module accumulates a touch time during which the touch continues and no other touch is detected by the touch screen if the touch is located in the edge area of the touch screen, and determines whether the accumulated touch time exceeds a preset time. The touch information removing module removes related information of the touch from an event triggered by the touch until the touch ends if the touch time exceeds the preset time.

According to an embodiment of the invention, the portable electronic apparatus further includes a gravity sensor. The gravity sensor detects an orientation of the portable electronic apparatus, in which the orientation is one of a transverse state and a longitudinal state. Besides, the modules further include an edge area setting module which sets the edge area for determining the touch location to be two edge areas of the touch screen in a transverse direction under the orientation detected by the gravity sensor.

According to an embodiment of the invention, the edge area setting module further detects whether the orientation changes by using the gravity sensor and adjusts the edge area for determining the location to be the two edge areas of the touch screen in the transverse direction under the changed orientation if the orientation changes.

In an embodiment of the invention, a portable electronic apparatus includes a touch screen, a storage unit, and at least one processing unit is provided, in which the touch screen is configured to detect a touch, and the storage unit is configured to record a plurality of modules. The processing unit is connected to the touch screen and the storage unit and configured to access and execute the modules recorded in the storage unit. The modules include a touch location determination module, and a touch information removing module. The touch location determination module activates the touch screen to detect the touch and determines whether the touch is located in an edge area of the touch screen if a screen wake-up signal is detected in a screen-off state. The touch location determination module accumulates a touch time during which the touch continues and no other touch is detected by the touch screen if the touch is located in the edge area of the touch screen. The touch information removing module removes related information of the touch from an event triggered by the touch until the touch ends if the touch location determination module determines the touch is located in the edge area of the touch screen.

According to an embodiment of the invention, the edge area of the touch screen is an area spaced from at least one edge of the touch screen by a predetermined distance.

Based on the above, the embodiments of the invention provide a portable electronic apparatus and a touch detecting method thereof which detects a touch in the edge area of the touch screen and determines the touch is a false touch if it is determined that the touch continues and no other touch is detected. The related information of the touch is further removed from an event triggered by the touch, thereby avoiding the false action caused by a user holding the portable electronic apparatus.

In order to make the above features and advantages of the invention more apparent, the embodiments are particularly cited with the accompanying drawings and described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Because of the slim border design of the portable electronic apparatus, user's fingers often inadvertently touch the touch screen when the user holds the handheld portable electronic apparatus with a single hand. However, under this circumstance, the touch detected by the touch screen is often located in the edge area and usually lasts for a long time. Based on this characteristic, in the present invention, a touch time during which the touch continues to be in the edge area of the touch screen and no other touch is detected is accumulated. Once the touch time exceeds a preset time, the touch is determined as being caused by the user holding the portable electronic apparatus rather than actual operations of the user performed on the touch screen. Accordingly, the touch is removed from an event triggered thereby, and false touches from the user can be prevented.

Figure 1:
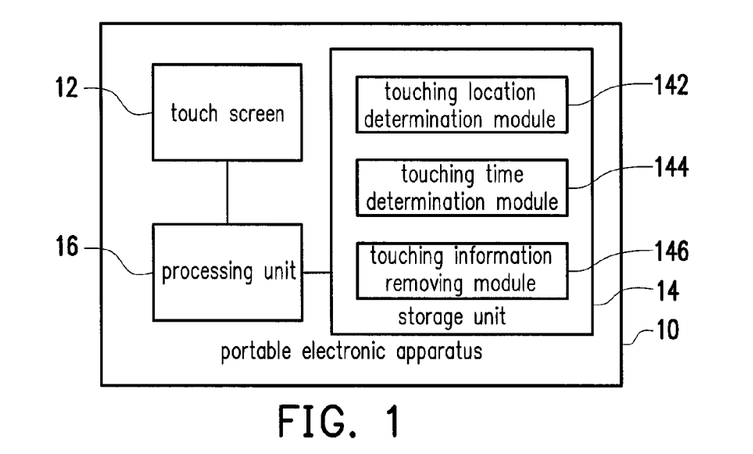
FIG. 1 is a block diagram illustrating a portable electronic apparatus according to an exemplary embodiment of the invention.

FIG. 1 is a block diagram illustrating a portable electronic apparatus 10 according to an exemplary embodiment of the invention. With reference to FIG. 1, the portable electronic apparatus may be, for example, a mobile phone, a smart phone, a personal digital assistant (PDA), a tablet PC, an e-book, or any other electronic apparatus equipped with a touch screen; however, the invention is not limited thereto. The portable electronic apparatus 10 includes a touch screen 12, a storage unit 14, and at least one processing unit 16; the functions of these components are respectively illustrated below.

The touch screen 12 is a display device integrated with touch detection components and may simultaneously provide the display function and the input function. The display device may be, for example, an LCD, a light-emitting diode (LED), a field emission display (FED), or any other type of display, while the invention is not limited thereto. The touch detection components are disposed in rows and columns on the display device for detecting user's fingers or palm or other objects touching the touch screen 12. The touch detection components may be, for example, capacitive touch detection components, surface acoustic wave touch detection components, electromagnetic touch detection components, or near-field imaging touch detection component, which should not be construed as a limitation to the invention.

The storage unit 14 is, for example, any type of fixed or movable random access memory (RAM), read-only memory (ROM), flash memory, hard disk, or other similar devices, or a combination of these devices and is used for recording a plurality of modules that can be executed by the processing unit 16. These modules are loaded by the processing unit 16 to perform the touch detecting method provided by the invention.

The processing unit 16 may be, for example, a central processing unit (CPU), or any other programmable general-purpose or special-purpose microprocessor, a digital signal processor (DSP), a programmable controller, an application specific integrated circuit (ASIC), a programmable logic device (PLD), or any other similar device, or a combination of these devices. The processing unit 16 is coupled to the touch screen 12 and the storage unit 14 and may access and execute the modules recorded in the storage unit 14, so as to perform the touch detecting function.

The above modules include a touch location determination module 142, a touch time determination module 144, and a touch information removing module 146. The modules may be, for example, computer programs capable of being loaded into the processing unit 16 to perform the touch detecting function. The following embodiments are provided to elaborate the detailed steps of the touch detecting method performed by the portable electronic apparatus 10.

Figure 2:
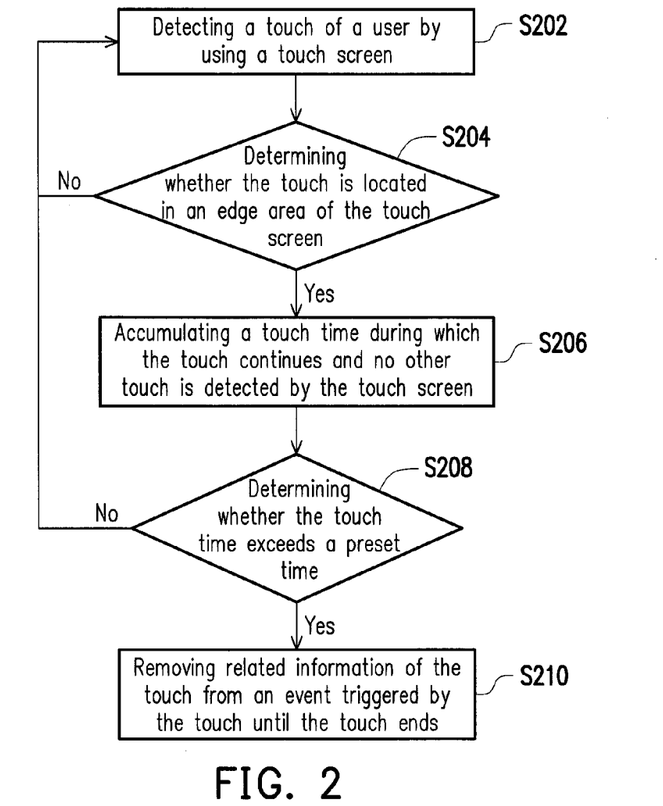
FIG. 2 is a flow chart illustrating a touch detecting method according to an exemplary embodiment of the invention.

FIG. 2 is a flow chart illustrating the detecting method according to an exemplary embodiment of the invention. As shown in FIG. 2, the method provided in the present embodiment is adapted for the portable electronic apparatus 10 of FIG. 1, and the steps of the touch detecting method are described hereinafter with reference to the components in the portable electronic apparatus 10.

First, a touch is detected by the touch screen 12 of the portable electronic apparatus 10 (step S202), and the touch location determination module 142 determines whether the touch is located in the edge area of the touch screen (step S204). Here, the edge area may be, for example, an area inside the touch screen 12 spaced from at least one edge of the touch screen 12 by a predetermined distance. The predetermined distance may be adjusted automatically according to the size of the border of the portable electronic apparatus 10; for instance, the predetermined distance is from about 0.5 cm to about 1 cm, and the predetermined distance may also be adjusted by the users manually.

Figure 3:
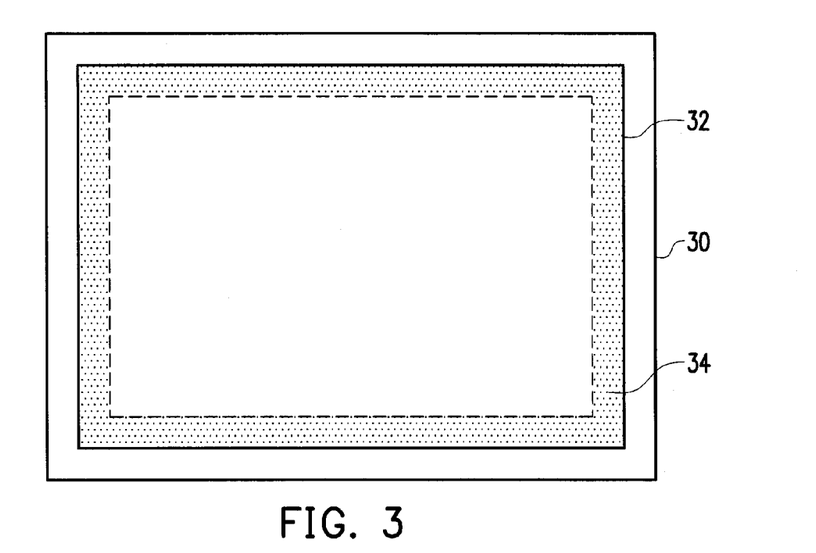
FIG. 3 is a schematic diagram illustrating an edge area according to an exemplary embodiment of the invention.

For example, FIG. 3 is a schematic diagram illustrating an edge area according to an exemplary embodiment of the invention. As shown in FIG. 3, the edge area 34 for determining the touch location is set to be within 1 cm from the upper edge, the lower edge, the left edge, and the right edge of the touch screen 32 of the portable electronic apparatus 30 in the embodiment.

In the flow chart of FIG. 2, if the touch location determination module 142 determines that the touch is not located in the edge area, it can be determined that the touch is not a false touch of the user. Therefore, the flow is back to step S202, and the touch screen 12 continues to detect a next touch of the user. Contrarily, if the touch location determination module 142 determines that the touch is located in the edge area of the touch screen 12, the touch may be determined to be a false touch. The touch time determination module 144 accumulates a touch time during which the touch continues and no other touch is detected by the touch screen 12 at the same time (step S206) and determines whether the touch time exceeds a preset time (step S208).

In detail, when a user holds the portable electronic apparatus 10 with one hand, the touch operation is often done by the other hand. There is a time interval between the user's action of picking up the portable electronic apparatus 10 with one hand and the user's action of touching the portable electronic apparatus 10 with the other hand. According to the present embodiment, the time interval may be applied to assist in determining whether the touch in the edge area of the touch screen 12 is a false touch by the holding hand. The touch is determined to be a false touch only when the touch time exceeds the preset time and no other touch is detected within the preset time.

It is noted that the preset time is about 0.5 to 1 second, for example, which should however not be construed as a limitation to the invention. If the preset time is set to be longer, the portable electronic apparatus 10 detects fewer number of times of the false touches, but the detection result is more accurate. Contrarily, if the preset time is set to be shorter, the portable electronic apparatus 10 may easily detect the false touches, but the detection result is less accurate. Therefore, the length of the preset time may be adjusted by the user at any time according to the user's habits.

According to the flow chart of FIG. 2, if the touch time determination module 144 determines the accumulated touch time exceeds the preset time, the touch information removing module 146 removes related information of the touch from an event triggered by the touch until the touch ends (step S210). On the contrary, the flow returns to the step S202, and the touch screen 12 continues to detect a next touch. Here, when the touch screen 12 detects the touch, the frame displayed by the portable electronic apparatus 10 on the touch screen 12 may be a standby frame, a main frame, or a frame of the currently executed application; the touch may trigger different events corresponding to the location of the touch on the touch screen 12. For example, an unlocking event is triggered in the standby frame, an activating event of an application is triggered in the main frame, an operating event of an application is triggered in the application frame, and so forth. However, after the determination steps provided above are performed, the touch detected by the touch screen 12 has been determined to be a false touch. Therefore, the related information of the touch is removed from the event triggered by the touch according to the embodiment, and the false action resulted from the user's false touch may be removed.

In the present embodiment, the touch detecting method may be applied at any time when the screen is in an enabled state, and the user's false touch may be detected at all times. However, in another embodiment, the touch detecting method may be applied to the portable electronic apparatus at the instant of waking the screen up from the screen-off state. For example, the touch location determination module 142 activates the touch screen 12 to detect the touch on the edge area when a screen wake-up signal is detected in the screen-off state, and the touch information removing module 146 determines whether to remove the related information of the touch from the event triggered by the touch. In detail, when the user intends to use the portable electronic apparatus 10, the user usually holds the portable electronic apparatus 10 and presses a physical button, such as a power button or a Home button. Then, the user performs operations on the touch screen 12 by the other hand. In the embodiment, the touch screen 12 detects whether the edge area is touched at an instant of waking the screen up from the screen-off state, and thereby the false touch may be removed earlier.

According to the above method, the portable electronic apparatus may accurately determine whether the touch in the edge area is inadvertent and accordingly remove the touch from the event triggered by the touch. Therefore, the false touch may be avoided.

In the previous embodiment, the edge area for determining the touch location is set to be at the four edges of the touch screen. However, since a user usually holds a lateral side of the portable electronic apparatus by one hand, in another embodiment, the orientation of the portable electronic apparatus is further detected, and accordingly the location of the edge area may be adjusted to comply with the user's actual use conditions, which will be further explained in the following embodiment.

Figure 4:
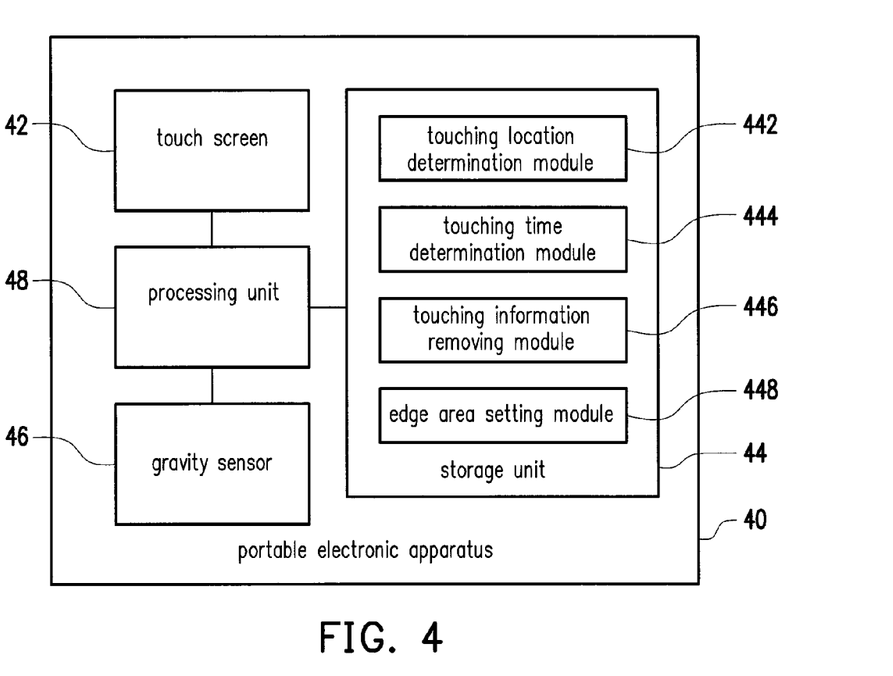
FIG. 4 is a block diagram illustrating a portable electronic apparatus according to an exemplary embodiment of the invention.

FIG. 4 is a block diagram illustrating the portable electronic apparatus according to an exemplary embodiment of the invention. As shown in FIG. 1, in the present embodiment, the portable electronic apparatus 40 may be, for example, a mobile phone, a smart phone, a PDA, a tablet PC, an e-book, and any other electronic apparatus having the touch screen, which should not be construed as a limitation to the invention. The portable electronic apparatus 40 includes a touch screen 42, a storage unit 44, a gravity sensor 46, and at least one processing unit 48. The types and functions of the touch screen 42, the storage unit 44, and the processing unit 48 are similar to those of the touch screen 12, the storage unit 14, and the processing unit 16 in the previous embodiments and thus will not be further described hereinafter.

Different from the previous embodiment, the portable electronic apparatus 40 in the present embodiment is additionally disposed with a gravity sensor 46, which can be used to detect three-axis components of the portable electronic apparatus 40, so as to obtain the orientation of the portable electronic apparatus 40.

In addition, the storage unit 44 stores the touch location determination module 442, the touch time determination module 444, the touch information removing module 446, and the edge area setting module 448, in which the touch location determination module 442, the touch time determination module 444, and the touch information removing module 446 are similar to or the same as the touch location determination module 142, the touch time determination module 144, and the touch information removing module 146 in the above embodiments and the functions thereof will not be repeated here. The difference between the previous embodiment and the present embodiment is that the edge area setting module 448 provided herein detects the orientation of the portable electronic apparatus 40 by using the gravity sensor 46 before detecting the touch, and accordingly decides the edge area for subsequently determining the touch location.

Figure 5:
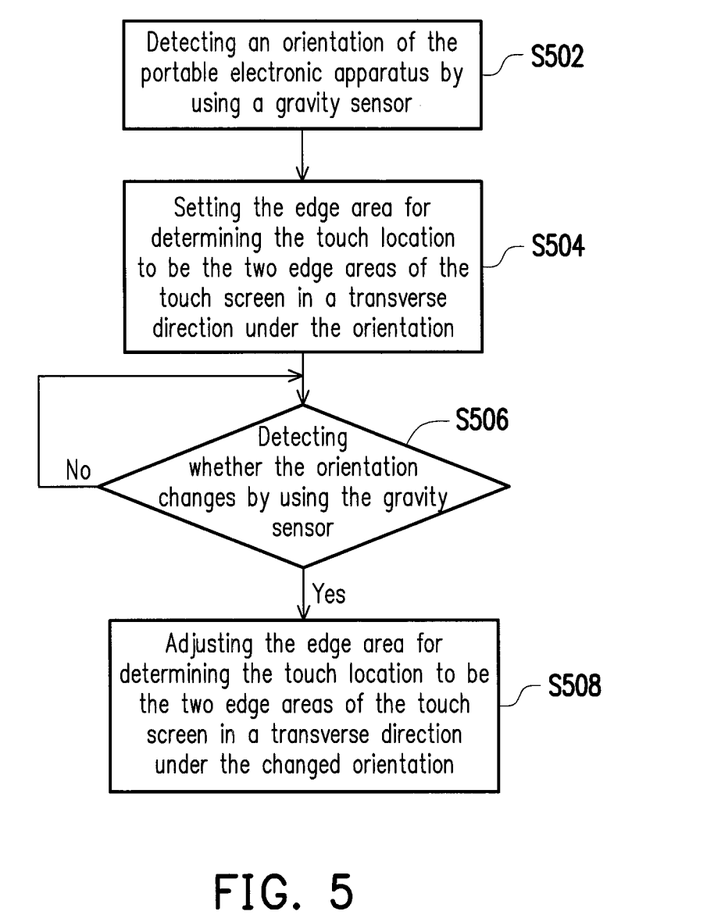
FIG. 5 is a flow chart illustrating a method of adjusting an edge area according to an exemplary embodiment of the invention.

In detail, FIG. 5 is a flow chart illustrating the method of adjusting the edge area according to an exemplary embodiment of the invention. As shown in FIG. 5, the method provided in the embodiment is adapted for the portable electronic apparatus 40 depicted in FIG. 4, and the touch detecting method is elaborated below with reference to the components of the portable electronic apparatus 40.

First, the portable electronic apparatus 40 detects its orientation by using the gravity sensor 46 (step S502), and the gravity sensor 46, for instance, detects the three-axis components of the portable electronic apparatus 40, so as to determine whether the current orientation of the portable electronic apparatus 40 is a transverse state or a longitudinal state.

Next, the edge area setting module 448 sets the edge area for determining the touch location to be two edge areas of the touch screen 42 in a transverse direction under the orientation detected by the gravity sensor 46 (step S504).

After the setting is complete, the edge area setting module 448 further detects whether the orientation of the portable electronic apparatus 40 changes (step S506). If the orientation of the portable electronic apparatus 40 does not change, the edge area remains unchanged. On the contrary, if the orientation of the portable electronic apparatus 40 changes, the edge area setting module 448 may adjust the edge area for determining the location to be the two edge areas of the touch screen 42 in the transverse direction under the changed orientation (step S508).

Figure 6A:
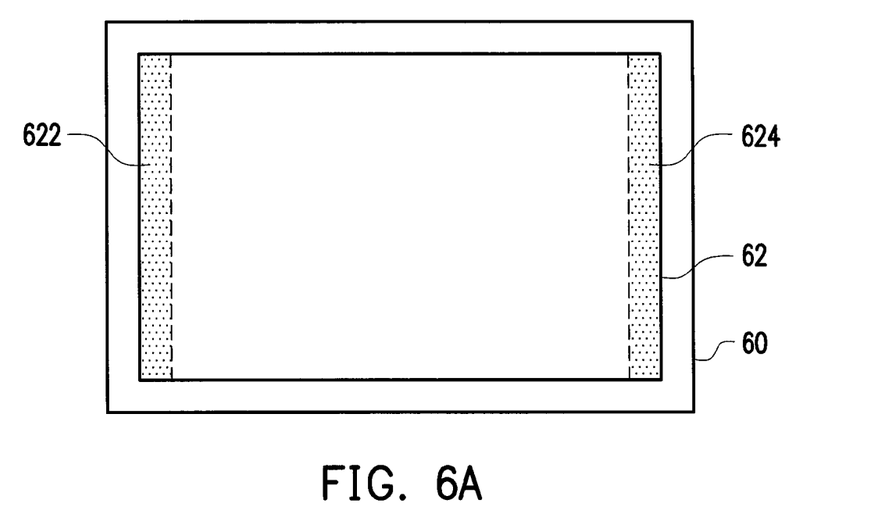
FIGS. 6A and 6B are schematic diagrams respectively illustrating the configuration of the edge area according to an exemplary embodiment of the invention.
Figure 6B:
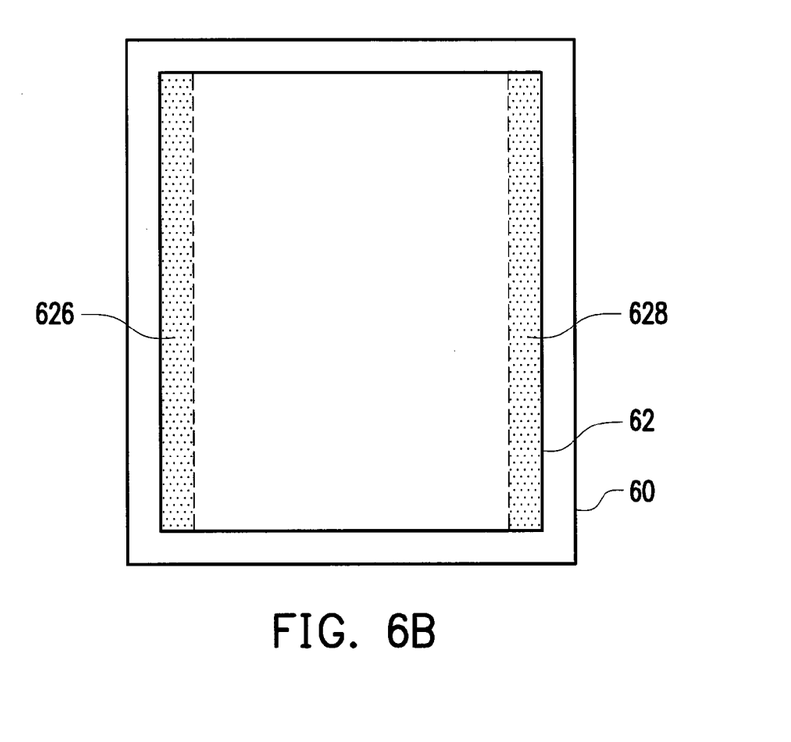

For example, FIGS. 6A and 6B are schematic diagrams respectively illustrating the setting of the edge area according to an exemplary embodiment of the invention. In FIG. 6A, if the portable electronic apparatus 40 detects that the orientation is in the transverse state by using the gravity sensor (not shown), the left edge area 622 and the right edge area 624 of the touch screen 62 are set to be the edge area for determining the touch location. As shown in FIG. 6B, when the portable electronic apparatus 60 detects that the orientation is in the longitudinal state by using the gravity sensor (not shown), the left edge area 626 and the right edge area 628 of the touch screen 62 are set to be the edge area for determining the touch location.

In summary, the embodiments of the invention provide a portable electronic apparatus and a touch detecting method thereof, which detect the touch in the edge area of the touch screen according to the orientation of the portable electronic apparatus. The touch is determined to be a false touch if the touch continues and no other touch is detected. Accordingly, the related information of the touch is removed from an event triggered by the touch. Thus, the false touch of the portable electronic apparatus resulting from the user's hand holding the portable electronic apparatus may be avoided. In an embodiment of the invention, the edge area may be further adjusted according to the orientation of the portable electronic apparatus, such that the edge area may fit the area where the user may perform the false touch. In an embodiment of the invention, the false touch can be detected at the instant of waking the screen up from the screen-off state.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch detecting method of a portable electronic apparatus, adapted for the portable electronic apparatus having a touch screen and a gravity sensor, the touch detecting method comprising:
   detecting a screen wake-up signal in a screen-off state, wherein the screen wake-up signal is generated in response to a power button or a Home button being pressed, and a touch and display function of the touch screen is disabled in the screen-off state;
   in response to detecting the screen wake-up signal, activating the touch screen to detect a touch and determining whether the touch is located in an edge area of the touch screen at an instant of waking the touch screen from the screen-off state, wherein before the step of determining whether the touch is located in the edge area of the touch screen, the touch detecting method further comprises:
      detecting an orientation of the portable electronic apparatus by using the gravity sensor, wherein the orientation is one of a transverse state and a longitudinal state; and
      setting the edge area for determining a location of the touch to be two edge areas of the touch screen in a transverse direction under the orientation;
      detecting whether the orientation changes by using the gravity sensor; and
      in response to determining the orientation changes, adjusting the edge area for determining the location of the touch to be the two edge areas of the touch screen in the transverse direction under the changed orientation;
   in response to detecting the touch is located in the edge area of the touch screen, accumulating a touch time during which the touch continues and no other touch is detected and determining whether the touch time exceeds a preset time; and
   in response to determining the touch time exceeds the preset time, removing related information of the touch from an event triggered by the touch until the touch ends.

2. The touch detecting method according to claim 1, wherein the edge area is an area spaced from at least one edge of the touch screen by a predetermined distance.

3. A portable electronic apparatus comprising:
   a touch screen, configured to detect a touch;
   a gravity sensor, configured to detect an orientation of the portable electronic apparatus, wherein the orientation is one of a transverse state and a longitudinal state;
   a storage unit, configured to record a plurality of modules; and
   at least one processing unit, connected to the touch screen and the storage unit, and configured to access and execute the modules recorded in the storage unit, the modules comprising:
      an edge area setting module, setting an edge area for determining a location of the touch to be two edge areas of the touch screen in a transverse direction under the orientation detected by the gravity sensor and adjusting the edge area for determining the location to be the two edge areas of the touch screen in the transverse direction under the changed orientation in response to detecting the orientation changes;

a touch location determination module, activating the touch screen to detect the touch and determining whether the touch is located in the edge area of the touch screen at an instant of waking the touch screen from a screen-off state in response to detecting a screen wake-up signal in the screen-off state, wherein the screen wake-up signal is generated in response to a power button or a Home button being pressed, and a touch and display function of the touch screen is disabled in the screen-off state;

a touch time determination module, accumulating a touch time during which the touch continues and no other touch is detected by the touch screen in response to the touch location determination module determining the touch is located in the edge area of the touch screen, and determining whether the touch time exceeds a preset time; and a touch information removing module, removing related information of the touch from an event triggered by the touch until the touch ends in response to the touch time determination module determining the touch time exceeds the preset time.

4. The portable electronic apparatus according to claim 3, wherein the edge area is an area spaced from at least one edge of the touch screen by a predetermined distance.

* * * * *